(12) United States Patent
Salter et al.

(10) Patent No.: US 10,928,239 B1
(45) Date of Patent: Feb. 23, 2021

(54) WHEEL DEPTH WATER CAPACITIVE FENDER MOLDING

(71) Applicant: Ford Global Technologies, LLC, Dearborn, MI (US)

(72) Inventors: Stuart C. Salter, White Lake, MI (US); John Robert Van Wiemeersch, Novi, MI (US); Pietro Buttolo, Dearborn Heights, MI (US); Steven Schondorf, Dearborn, MI (US); David James Tippy, Ann Arbor, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/596,591

(22) Filed: Oct. 8, 2019

(51) Int. Cl.
*G01F 23/26* (2006.01)
*B60W 50/14* (2020.01)

(52) U.S. Cl.
CPC .......... *G01F 23/268* (2013.01); *B60W 50/14* (2013.01); *G01F 23/265* (2013.01); *G01F 23/266* (2013.01)

(58) Field of Classification Search
CPC .... G01F 23/268; G01F 23/266; G01F 23/263; G01F 23/26; G01F 23/265; B60W 50/14
See application file for complete search history.

(56) References Cited

U.S. PATENT DOCUMENTS

| 6,650,244 | B1* | 11/2003 | Chen | G08B 21/20 340/425.5 |
| 9,182,265 | B1* | 11/2015 | Ward | G01F 23/266 |
| 9,227,479 | B2 | 1/2016 | Clarke et al. | |
| 9,278,659 | B2 | 3/2016 | Schondort et al. | |
| 9,533,575 | B2* | 1/2017 | Tran | G01S 15/931 |
| 9,884,555 | B2* | 2/2018 | Tran | F02D 11/105 |
| 9,908,513 | B2* | 3/2018 | Deeks | B60K 11/06 |
| 10,160,454 | B2* | 12/2018 | Barthel | B60W 50/14 |
| 10,279,681 | B2* | 5/2019 | Popham | B60W 30/18009 |

(Continued)

FOREIGN PATENT DOCUMENTS

| CN | 104401248 A | 3/2015 |
| DE | 102007057259 A1 | 5/2009 |
| EP | 2698299 A1 | 2/2019 |

OTHER PUBLICATIONS

Döring, J. et al., A Novel Approach for Road Surface Wetness Detection with Planar Capacitive Sensors, (Research Paper), Journal of Sensors and Sensor Systems, Jan. 21, 2019, pp. 57-66, vol. 8.

*Primary Examiner* — Ryan W Sherwin
(74) *Attorney, Agent, or Firm* — Frank Lollo; Eversheds Sutherland (US) LLP (57) ABSTRACT

This disclosure is generally directed to systems and methods for detecting a water depth level using capacitive sensors. The systems and methods disclosed herein receive a first capacitive signal from a first capacitive sensor in a wheel well of a vehicle. The systems and methods may determine that the first capacitive signal is not below a threshold value. The systems and methods display an image in a cab of the vehicle, wherein the image corresponds to a water depth level associated with the first capacitive signal. The systems and methods receive a second capacitive signal from a second capacitive sensor corresponding to a rising water level. The systems and methods display a warning message, on a display, indicating the rising water level.

20 Claims, 10 Drawing Sheets

(56) References Cited

U.S. PATENT DOCUMENTS

| | | |
|---|---|---|
| 10,282,957 B1* | 5/2019 | Kirkbride .............. G08B 17/12 |
| 10,773,557 B1* | 9/2020 | Mast ....................... G06T 7/001 |
| 2013/0283647 A1* | 10/2013 | Borges ................... E01H 5/061 37/227 |
| 2014/0156126 A1* | 6/2014 | Tran ..................... G01F 23/242 701/22 |
| 2014/0184247 A1* | 7/2014 | Tran ..................... G01F 23/242 324/663 |
| 2014/0293746 A1* | 10/2014 | Tran ....................... G01S 15/88 367/93 |
| 2015/0046032 A1* | 2/2015 | Clarke ................... G01S 15/00 701/37 |
| 2015/0066339 A1* | 3/2015 | Hoare ................. B60W 40/06 701/116 |
| 2016/0229460 A1* | 8/2016 | Kowalk .................... B60S 1/66 |
| 2016/0264139 A1* | 9/2016 | Gauthier ............... B60W 30/09 |
| 2018/0073879 A1* | 3/2018 | Hakeem ............ G01C 21/3415 |
| 2018/0229560 A1* | 8/2018 | DeCia .................. B60C 23/045 |
| 2019/0077406 A1 | 3/2019 | Dudar et al. |
| 2020/0130622 A1* | 4/2020 | Lerner ................. B60W 30/00 |
| 2020/0271116 A1* | 8/2020 | Haffenden .......... G01F 25/0061 |

* cited by examiner

WHEEL DEPTH WATER CAPACITIVE FENDER MOLDING

TECHNICAL FIELD

The present disclosure relates to a capacitive depth sensor system and method for use in a vehicle environment. In some embodiments, the present disclosure utilizes a capacitive sensing mechanism including capacitive sensor pads integrated into a plastic wheel well, a printed circuit board with one or more processors, a wireless radio, and an audiovisual device in the cabin of the vehicle. The sensing mechanism detects rising and/or falling levels of liquids and/or solids within the plastic wheel well, in response to changes in an electrostatic field generated by the sensing mechanism using aspects of the present disclosure.

BACKGROUND

The ability to determine when a vehicle's engine will stall, or electrical function will be compromised, as it is moving through water is often times difficult. When a driver is driving a vehicle through flooded terrain they must make a judgement call about whether it is best to turn around to avoid flooding the engine with water, or if the water has not reached a level that will flood the engine. When drivers misjudge the depth of water they are driving through, the engine could flood, stall, or even worse, need to be replaced depending on the corrosive nature of the water (e.g., salt water).

Some water depth technologies use ultrasonic sensors in the mirrors to detect and alert the operator of the vehicle as they are driving through flooded terrain. However, these sensors may not have the same precision as capacitive based sensors. Furthermore these sensors do not use low power consumption, and therefore require a draw of power from a battery in the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to detect water depth levels under and around a vehicle as is it driven in a flooded terrain using a capacitive water depth sensor system. The capacitive depth sensor system can be tuned to run with very low power consumption, and as such, can be used to monitor for water and flooding while the vehicle is parked for extended periods of time. In one embodiment, the capacitive water depth sensor system includes a plurality of capacitive sensors that are integrated into a cavity in the wheel well molding of the vehicle—with gaps to allow air to escape from the top of the wheel well molding. In another embodiment, the capacitive water depth sensor system includes a plurality of capacitive sensors that are integrated directly into the wheel well molding. The capacitive sensors are integrated into the cavity or the wheel well molding by way of application of a conductive primer to the plastic of the wheel well molding. The conductive primer creates an electrostatic field similar to an electrostatic field generated between two plates of a capacitive element. The electrostatic field may be created between capacitive sensors and the sheet metal of the vehicle to which the wheel well is attached. When water rises within the space between the wheel well and the sheet metal of the vehicle, a processor connected to the capacitive sensors can detect the level of water based on a change in the electrostatic field based at least in part to the dielectric constant of water. In some embodiments, the primer may be painted on a portion of the vehicle, other than the wheel well, and an electrostatic field may be generated by the primer. This embodiment, may provide more sensitivity to moisture collecting on the sensor created by the primer painted on the vehicle.

In some embodiments, there may be a hole in wheel well to allow air to escape as the water levels rise under the vehicle between the capacitive sensors and the sheet metal of the vehicle. The hole in the wheel well enables an accurate reading of the water depth level because the dielectric constant of air is present between the capacitive sensors that are not submerged in water, and the sheet metal. When a capacitive sensor is enclosed in an area without access to air, and there is water vapor in the enclosed area the dielectric constant of the area between the plates of the capacitive sensor is not exactly the same as air and therefore may give rise to inaccurate measurements.

The capacitive water depth sensor system also includes one or more processors that can analyze the intensity and pattern of a capacitive signal that is generated by the capacitive sensors, to determine when the capacitive sensors have accumulated dirt or snow. The one or more processors can further determine the difference between splashes of water that are detected by the capacitive sensors as the vehicle is traveling over a wet surface, and when the vehicle is being driven in water. The one or more processors can further determine when the vehicle is simply sitting (parked) on a flooded terrain. To this end the one or more processors may classify any sudden changes in a capacitive signal of the capacitive sensors, over a short period (less than a few seconds), as environmental substances begin to coat or stick to the capacitive sensors. Environmental substances may include, but are not limited to water, snow, dirt, mud, and/or any other substances that have the ability to adhere to the capacitive sensors. The capacitive sensors may detect one or more environmental substances as the environmental substances are projected upward into the gap between the wheel well and the sheet metal, but does not remain in the gap. Accordingly, the one or more processors may classify these sudden changes in capacitive signal as noise signals that are filtered out of a capacitive signal corresponding to a rising water level underneath the vehicle. For example, as the water level underneath a vehicle increases as the vehicle moves from a wet surface where the tires of the vehicle are not submerged to a surface where the tires are completely submerged, the water droplets and any other environmental substances detected by the capacitive sensors is filtered out of the capacitive signal corresponding to raising water levels increases.

In one example embodiment, a nozzle attached to a liquid dispensing tank may be attached to a component connecting the wheel well to the sheet metal. The space or gap between the wheel well and the sheet metal may be referred to as a chamber. The one or more processors may send instructions to an actuator that may cause the dispensing tank to dispense a cleansing solution to the capacitive sensors via the nozzle to remove any environmental substances that adhere to the capacitive sensors. These environmental substances may include dirt or mud. In some embodiments, the one or more processors may send a signal to a display in the cab of the vehicle instructing the operator of the vehicle to press a button on the touch display or elsewhere in the cab of vehicle that will cause the cleansing solution to be dispensed onto the capacitive sensors. In other embodiments, the one or more processors may determine that the capacitive signal received from the capacitive sensors corresponds to a noisy capacitive signal, and may send a signal to the actuator to dispense the cleansing solution onto the capacitive sensors.

This disclosure applies to both the powertrain and electrical infrastructure within of the vehicle. In some embodiments, the vehicle engine may include an internal combustion engine, battery electric vehicle (BEV), photoelectric vehicle (PHEV), one or more turbines or any other engine technology that propels a vehicle which may be compromised by water of a certain depth. The sensors disclosed herein detect water depth levels so as to prevent the compromise of any supporting electrical drives, engine controls, and/or wiring infrastructure included in the vehicle. It should be noted that the word vehicle is inclusive of, but not limited to petrol fueled cars, vans, buses, or trucks. The word vehicle also includes electric and/or hybrid cars, vans, buses, or trucks.

In some embodiments, additional capacitive sensors may be placed on around the engine of the vehicle, or certain areas around an electrical system of the vehicle. If a particular location of the engine or electrical system happens to be particularly sensitive to moisture, additional capacitive sensors may be placed in these locations to help prevent the engine from flooding or the electrical system from short-circuiting. These and other advantages of the present disclosure are provided in greater detail herein.

Illustrative Embodiments

Figure 1:
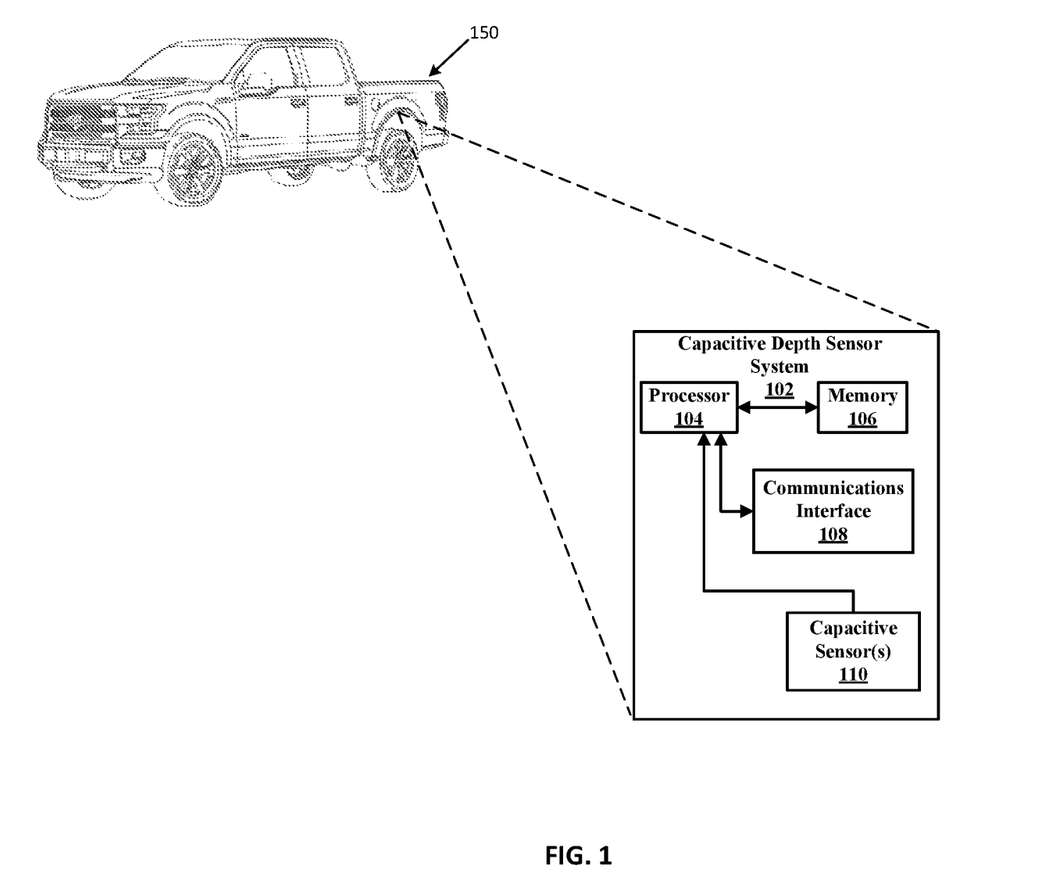
FIG. 1 illustrates an exemplary capacitive depth sensor system in accordance with the present disclosure.

FIG. 1 depicts a capacitive depth sensor system 102 embedded in a fender portion of vehicle 150. Capacitive depth sensor system 102 depicts an illustrative architecture in which techniques and structures of the present disclosure may be implemented. In various embodiments, the vehicles mentioned herein include a capacitive depth sensor system 102.

In some embodiments, capacitive depth sensor system 102 comprises a processor 104 and memory 106. Memory 106 stores instructions that are executed by processor 104 to perform aspects of the discussed water depth condition analysis and generate the warnings disclosed herein. When referring to operations executed by the capacitive depth sensor system 102 it will be understood that this includes the execution of instructions by processor 104.

Capacitive depth sensor system 102 may be affixed to the inside of a fender portion of a vehicle. For example, the capacitive depth sensor system may be affixed to the inside of fender portion 102. The capacitive depth sensor system 102 may be implemented on a printed circuit board (PCB).

Figure 9A:
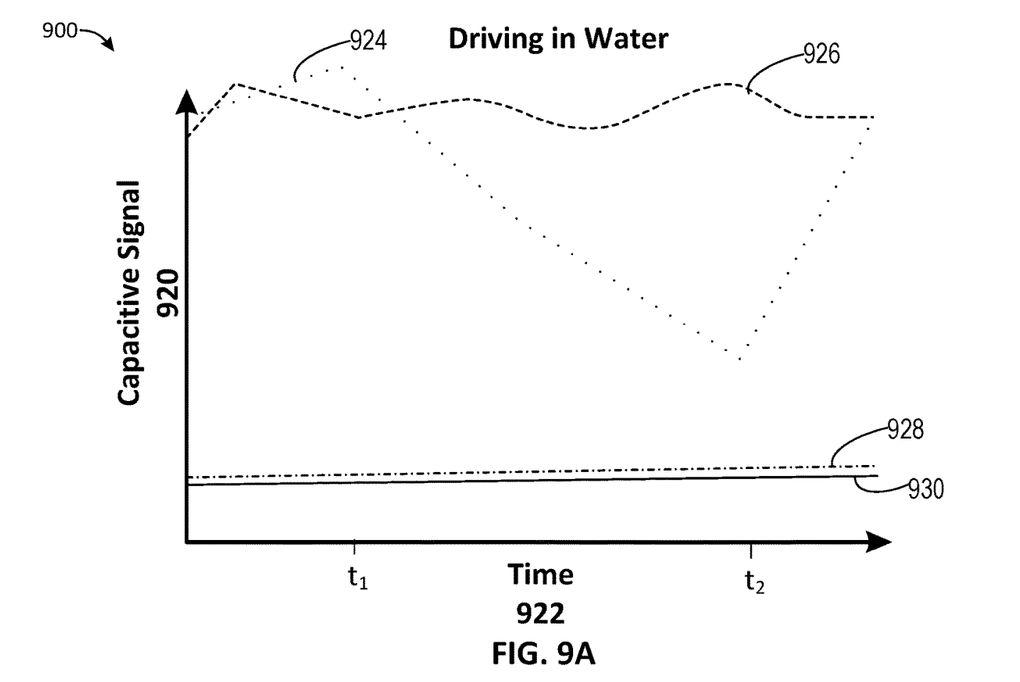
FIG. 9A is a graphical representation of a capacitive water depth sensor system detecting water in a wheel well molding in accordance with the present disclosure.

Processor 104 may perform the same functions as those described with general reference to the processor throughout the application. That is, the processor may perform the blocks in FIG. 9. Capacitive sensor(s) 110 may comprise the first capacitive sensor and a second capacitive sensor as discussed herein. Processor 104 may receive signals from a detector circuit, that may be included in capacitive proximity sensor system 102, that indicate when the capacitance of one or both of capacitive sensor(s) 110 has changed.

Figure 2:
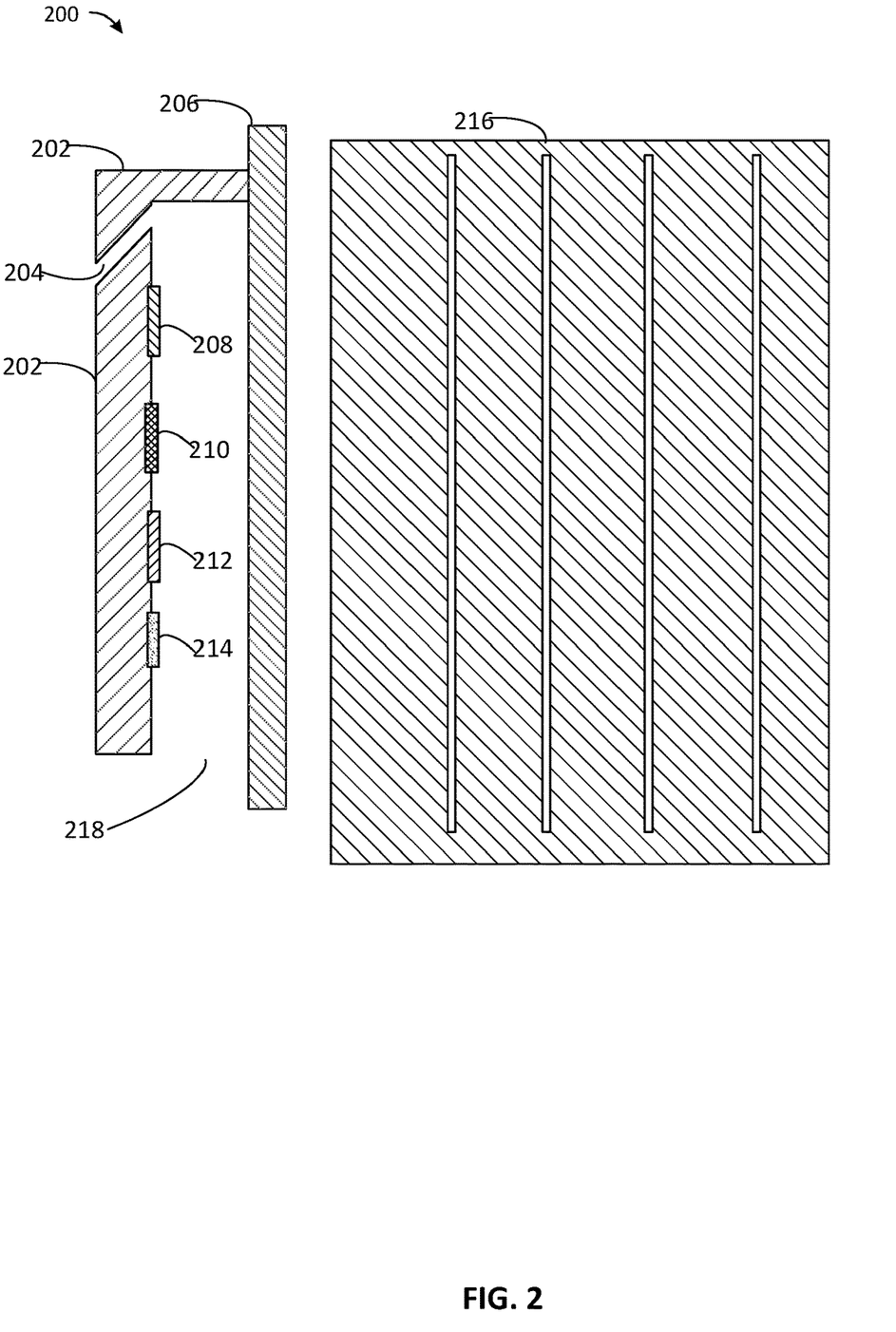
FIG. 2 depicts an illustrative capacitive water depth sensor system integrated into a wheel well molding in accordance with the present disclosure.

FIG. 2 depicts a fender portion 200 of a vehicle in which techniques and structures of the present disclosure may be implemented. Fender portion 200 may also be referred to as a wheel well. The fender portion 200 may include a wheel 216, fender molding 202, sheet metal 206, capacitive sensor 208, capacitive sensor 210, capacitive sensor 212, capacitive sensor 214, air hole 204, and gap 218. Fender molding 202 may be plastic, and may be treated with a conductive primer that works especially well for plastic surfaces in order to create a capacitive element. In some embodiments, instead of the conductive primer there may be a metal or other conductive pad used in place of the conductive primer. That is, before or after a plastic insert is molded into the fender molding 202, one or more portions of the plastic may be treated with the conductive primer. The location on fender molding 202 corresponding to capacitive sensor 208, capacitive sensor 210, capacitive sensor 212, and capacitive sensor 214, may be treated with the conductive primer in order to generate the corresponding capacitive sensors. Air hole 204 may be pre-molded or cut out of fender molding 202 in order to ensure that capacitive sensors 208, 210, 212, and 214 generate accurate capacitive signals. As mentioned above, air hole 204 enables air to enter gap 218 to ensure that capacitive sensors that are not covered in water and are also are not covered in water vapor that may form on those capacitive sensors due to lack of air in gap 218. For example, when capacitive sensors 214 and 212 are covered by water the dielectric constant associated with capacitive sensors 208 and 210 will corresponds to that of the dielectric constant of air, whereas the dielectric constant of capacitive sensors 212 and 214 will correspond to that of the dielectric constant of water. If air hole 204 was not in fender molding 202 and the vehicle was sitting in water, the water vapor could collect on capacitive sensors 208 and 210 resulting in these capacitive sensors generating inaccurate readings. For instance, if enough water vapor collects on these capacitive sensors, one or more processors that receive signals from the capacitive sensors may determine that that water levels may be starting to rise when in fact they are not. Further still, the one or more processors may even determine incorrectly that the vehicle is moving because water vapor is filing gap 218 thereby effecting the dielectric constant of those capacitive sensors.

Capacitive sensors 208, 210, 212, and 214 may be affixed to fender molding 202. Water may rise through gap 218 and may cause a change in the capacitive signal generated by capacitive sensors 208, 210, 212, and 214 as water rises vertically in gap 218. Capacitive sensors 208, 210, 212, and 214 may each generate an electrostatic field and a corresponding capacitive signal when there is no water in gap 218. When there is no water in gap 218, the capacitive signal generated by each of capacitive sensors 208, 210, 212, and 214 is based at least in part on the dielectric constant of air. When there is water interacting with, or disturbing, the electrostatic field generated by a capacitive sensor, the capacitive signal generated by the capacitive sensor is based at least in part on the dielectric constant of water. The dielectric constant of water is approximately 80 times that of air. Because the electric field is inversely proportional to the capacitance of a dielectric constant, and the dielectric constant of water is 80 times that of air, a decrease in the electrostatic field across a capacitive sensor will result in an increase in capacitance (increase in capacitive signal). This decrease in the electrostatic field may correspond to a positive numeric value. The one or more processors (not shown) may be communicatively coupled to capacitive sensors 208, 210, 212, and 214 on fender portion 202. The one or more processors may be attached to the fender molding nearby the capacitive pads or conductive primer, and the one or more processors may be over molded into the wheel well to protect it from the environment. By placing the pads closer to the one or more processors the less parasitic the capacitance signal will be, thereby yielding a better signal.

Figure 3A:
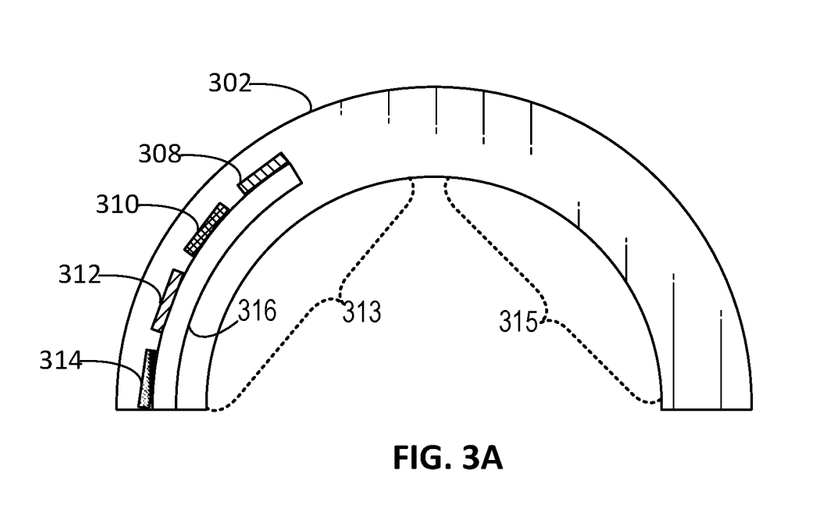
FIGS. 3A and 3B depict an illustrative capacitive water depth sensor system integrated into a wheel well molding in accordance with the present disclosure.
Figure 3B:
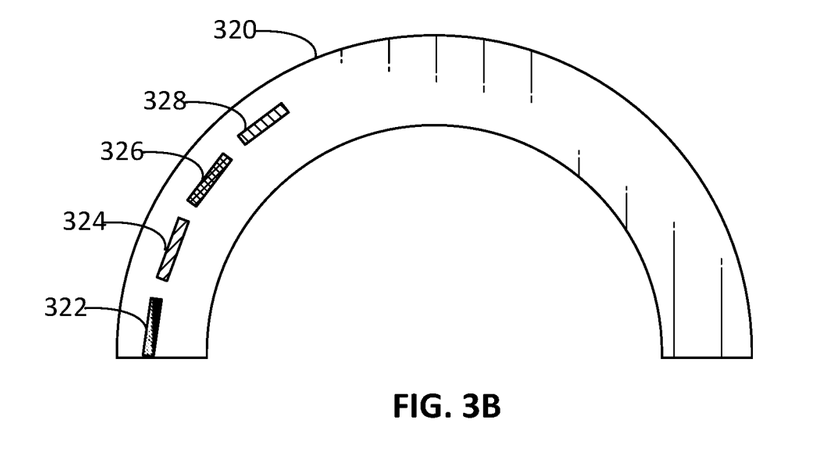

FIGS. 3A and 3B depict an illustrative capacitive water depth sensor system integrated into a wheel well molding in accordance with the present disclosure. In some embodiments, the sensor system may be located on a leading arch of the wheel well (i.e., closest to the front of the vehicle). Leading arch 313 may include capacitive sensors 302, 308, 310, 312, and 314. In other embodiments, the sensory system may be located on trailing arch 315. The sensor system may be placed in leading arch 313 or trailing arch 315 based at least in part on the body style and/or the height of the vehicle. The sensor system may be located on leading arch 313 to enable early detection of environmental substances. Placement of the sensor system on leading arch 313 will help avoid water being pushed into the sensor system by a wheel as it is rotating thereby causing a false level indication. Environment 300 illustrates a first embodiment in FIG. 3A of the arrangement of a plurality of capacitive sensors (capacitive sensors 308, 310, 312, and 314) on fender molding 302. Fender molding 302 may correspond to fender molding 202, shown in a different orientation. In this embodiment, capacitive sensors 308, 310, 312, and 314 are included in a cavity (cavity 316). Capacitive sensors 308, 310, 312, and 314 may be placed in cavity 316, which may comprise a plurality of gaps between each of the capacitive sensors to allow air to escape from between the capacitive sensors. Cavity 316 may be molded onto the backside of fender molding 302. That is, cavity 316 may be located on the same side of fender molding 202 on which capacitive sensors 208, 210, 212, and 214 are located. Environment 300 also illustrates a second embodiment in FIG. 3B of the arrangement of a plurality of capacitive sensors (capacitive sensors 322, 324, 326, and 328) on fender molding 320. In this embodiment, there may be no cavity to house capacitive sensors 322, 324, 326, and 328. It should be noted that capacitive sensors 308, 310, 312, and 314 have the same functionality as capacitive sensors 208, 210, 212, and 214. It should be noted that capacitive sensors 322, 324, 326, and 328 have the same functionality as capacitive sensors 208, 210, 212, and 214.

Figure 4:
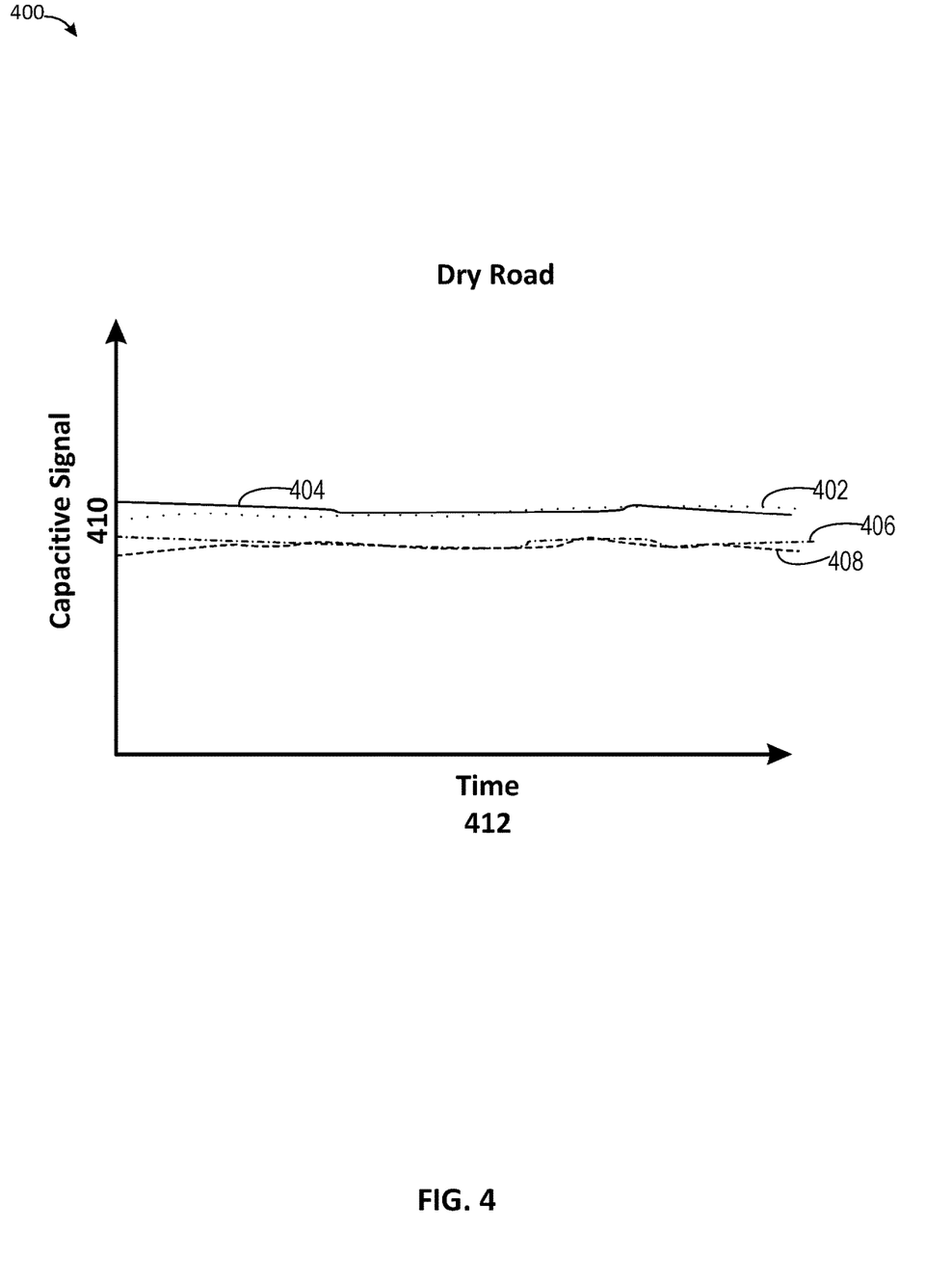
FIG. 4 is a graphical representation of a capacitive water depth sensor system detecting air in a wheel well molding in accordance with the present disclosure.

FIG. 4 is a graphical representation of a capacitive water depth sensor system detecting air in a wheel well molding in accordance with the present disclosure. Graph 400 depicts signals corresponding to capacitive sensors 308, 310, 312, and 314 for a vehicle traveling on a dry road. Graph 400 includes a time axis (Time 412) and a capacitive signal axis measuring the amplitude of the capacitive signal (Capacitive Signal 410) of capacitive sensors 208, 210, 212, and 214. For example, capacitive sensor 214 may generate a capacitive signal corresponding to capacitive signal 402. Capacitive sensor 212 may generate a capacitive signal corresponding to capacitive signal 404. Capacitive sensor 210 may generate a capacitive signal corresponding to capacitive signal 406. Capacitive sensor 208 may generate a capacitive signal corresponding to capacitive signal 408. Because air is the dielectric interacting with the electrostatic field generated by capacitive sensors 208, 210, 212, and 214 on a dry road, capacitive signals 402, 404, 406, and 408 are similar in amplitude over time. Furthermore the capacitive signals are nearly constant (straight line from left to right) because there is no change to the dielectric constant over time. Any changes to the dielectric constant may be due to random environmental substances that are projected upward into gap 218 which may be detected by the capacitive sensors.

Figure 5:
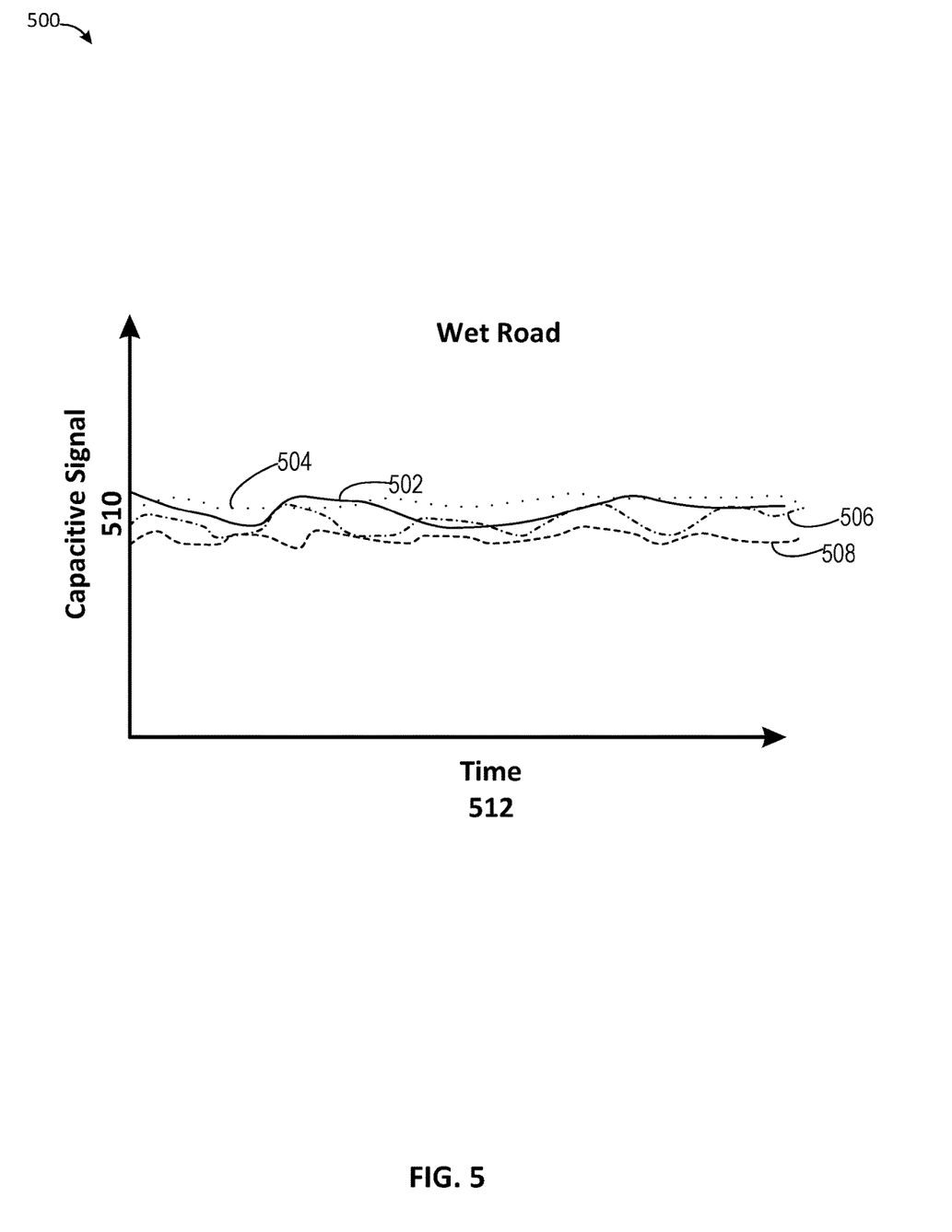
FIG. 5 is a graphical representation of a capacitive water depth sensor system detecting water droplets in a wheel well molding in accordance with the present disclosure.

FIG. 5 is a graphical representation of a capacitive water depth sensor system detecting water droplets in a wheel well molding in accordance with the present disclosure. Graph 500 depicts signals corresponding to capacitive sensors 208, 210, 212, and 214 for a vehicle traveling on a wet road. Graph 500 includes a time axis (Time 512) and a capacitive signal axis measuring the amplitude of the capacitive signal (Capacitive Signal 510) of capacitive sensors 208, 210, 212, and 214. For example, capacitive sensor 214 may generate a capacitive signal corresponding to capacitive signal 502. Capacitive sensor 212 may generate a capacitive signal corresponding to capacitive signal 504. Capacitive sensor 210 may generate a capacitive signal corresponding to capacitive signal 506. Capacitive sensor 208 may generate a capacitive signal corresponding to capacitive signal 508. Because air is still the dielectric interacting with the electrostatic field generated by capacitive sensors 208, 210, 212, and 214, even on a wet road, capacitive signals 402, 404, 406, and 408 are similar in amplitude over time. There will be some variability in the capacitive signals generated by the capacitive signals, and this will be due to the dielectric associated with water droplets from the wet road that interact with the electrostatic field generated by each of the capacitive sensors. Because the distribution of water droplets that are projected into gap 218, and therefore interact with the electrostatic fields of the capacitive sensors is random, the variance of the capacitive signals corresponding to the capacitive signals for each sensor may also follow this same random distribution. Accordingly, the average value (or expected value) across all of the capacitive sensors may be the same because the capacitive signals are based on the same random distribution.

Figure 6:
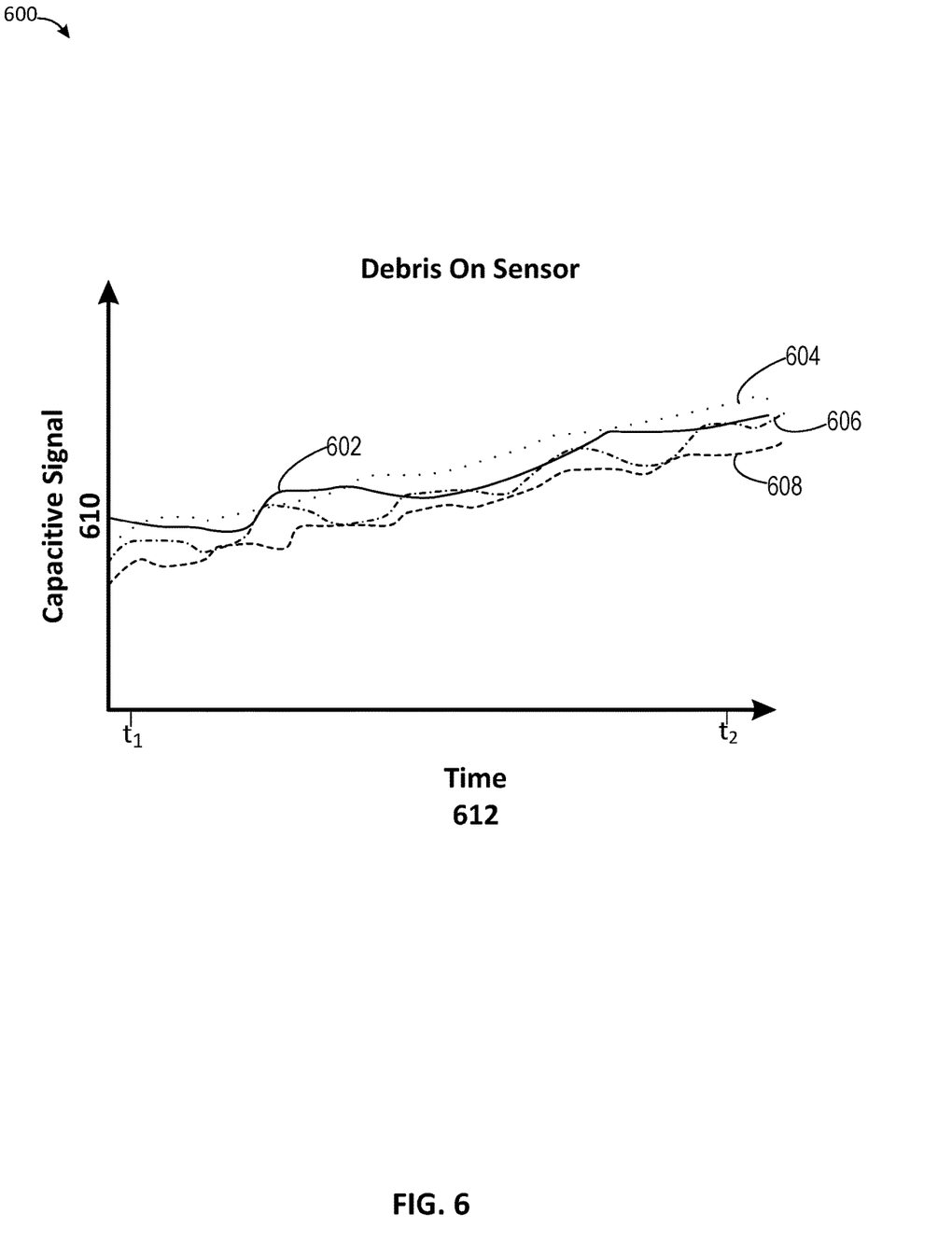
FIG. 6 is a graphical representation of a capacitive water depth sensor system detecting environmental substances in a wheel well molding in accordance with the present disclosure.

FIG. 6 is a graphical representation of a capacitive water depth sensor system detecting environmental substances in a wheel well molding in accordance with the present disclosure. Graph 600 depicts signals corresponding to capacitive sensors 208, 210, 212, and 214 for a vehicle traveling on a road with environmental substances on the capacitive sensors. The environmental substances may include dirt, mud, snow, ice or a combination of these and other environmental substances. Graph 600 includes a time axis (Time 612) and a capacitive signal axis measuring the amplitude of the capacitive signal (Capacitive Signal 610) of capacitive sensors 208, 210, 212, and 214. For example, capacitive sensor 214 may generate a capacitive signal corresponding to capacitive signal 602. Capacitive sensor 212 may generate a capacitive signal corresponding to capacitive signal 604. Capacitive sensor 210 may generate a capacitive signal corresponding to capacitive signal 606. Capacitive sensor 208 may generate a capacitive signal corresponding to capacitive signal 608. Because air is the dielectric interacting with the electrostatic field generated by capacitive sensors 208, 210, 212, and 214, before there is any environmental substance on the capacitive sensors (at time $t_1$), the amplitude of the capacitive signals generated by the capacitive sensors is less than it is after environmental substance has collected on the capacitive sensors (at time $t_2$). This is due to the fact that dirt and environmental substance have a dielectric constant that is different than air, and the dirt and environmental substance are dielectrics that will interact with, or disturb, the electrostatic field generated by the capacitive sensors, and thereby causing the capacitive signal to increase over time (as environmental substance is collected).

Figure 7:
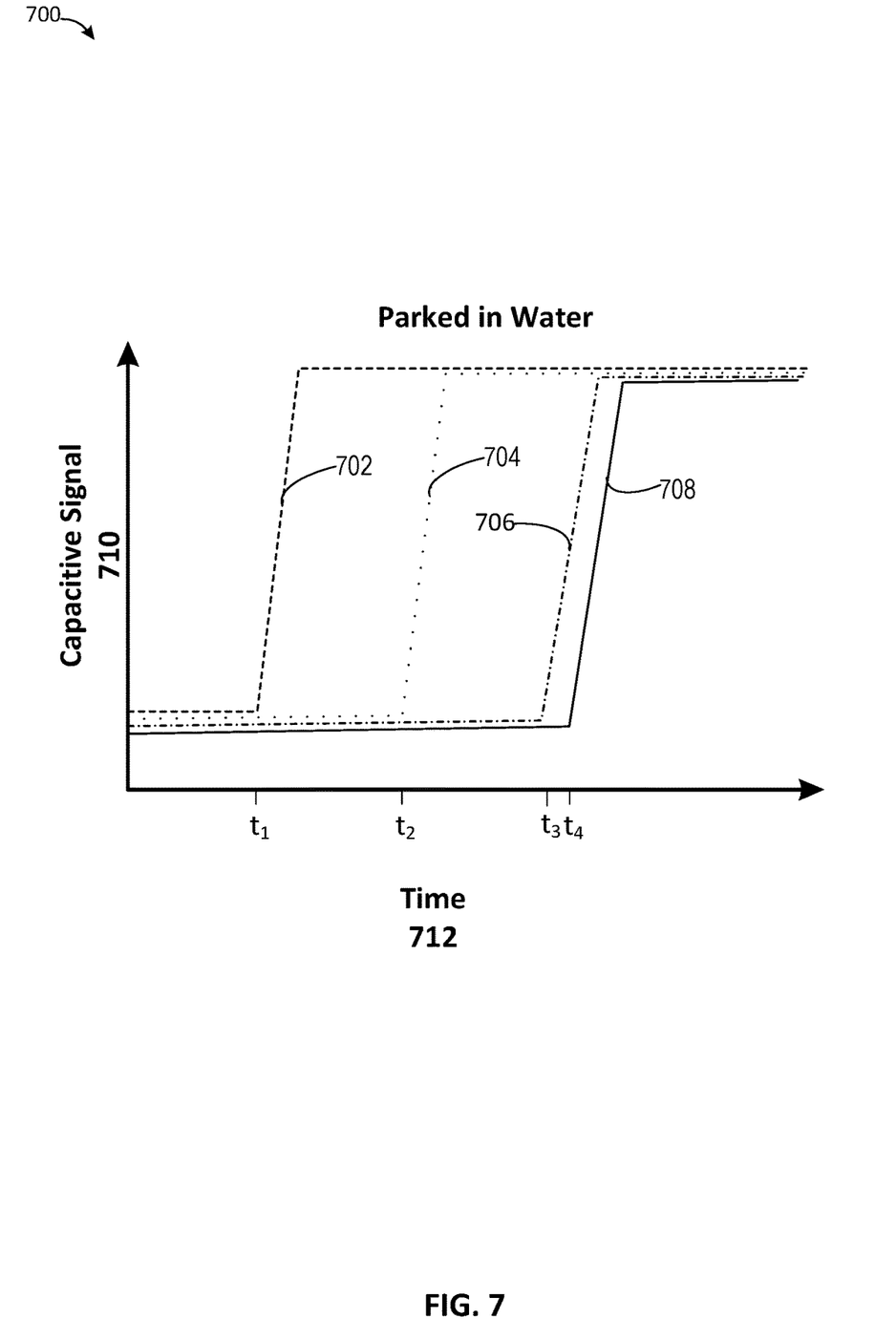
FIG. 7 is a graphical representation of a capacitive water depth sensor system detecting water in a wheel well molding in accordance with the present disclosure.

FIG. 7 is a graphical representation of a capacitive water depth sensor system detecting water in a wheel well molding in accordance with the present disclosure. Graph 700 depicts signals corresponding to capacitive sensors 208, 210, 212, and 214 for a vehicle parked in water. Graph 700 includes a time axis (Time 712) and a capacitive signal axis measuring the amplitude of the capacitive signal (Capacitive Signal 710) of capacitive sensors 208, 210, 212, and 214. For example, capacitive sensor 214 may generate a capacitive signal corresponding to capacitive signal 702. Capacitive sensor 212 may generate a capacitive signal corresponding to capacitive signal 704. Capacitive sensor 210 may generate a capacitive signal corresponding to capacitive signal 706. Capacitive sensor 208 may generate a capacitive signal corresponding to capacitive signal 708. As the vehicle travels forward, and the water level rises the capacitive signal for each capacitive sensors will increase from zero to a maximum value. For example, as water eclipses capacitive sensor 214, capacitive signal 702 will increase to a maximum amplitude. Because capacitive sensor 214 is the capacitive sensor closest to the ground, as seen in FIG. 2, the capacitive signal corresponding to capacitive sensor 214 will increase from zero to its maximum, at time $t_1$, value first because it is the first capacitive sensor to come into contact with the water. As water eclipses capacitive sensor 212, capacitive signal 704 will increase to a maximum amplitude. Because capacitive sensor 212 is the second closest capacitive sensor to the ground, as seen in FIG. 2, the capacitive signal corresponding to capacitive sensor 212 will increase from zero to its maximum value, at time $t_2$, after capacitive signal 702 because it is the second capacitive sensor to come into contact with the water. As water eclipses capacitive sensor 210, capacitive signal 706 will increase to a maximum amplitude. Because capacitive sensor 210 is the third closest capacitive sensor to the ground, as seen in FIG. 2, the capacitive signal corresponding to capacitive sensor 210 will increase from zero to its maximum value, at time $t_3$, after capacitive signal 704 because it is the third capacitive sensor to come into contact with the water. As water eclipses capacitive sensor 208, capacitive signal 708 will increase to a maximum amplitude. Because capacitive sensor 208 is the fourth closest capacitive sensor to the ground, as seen in FIG. 2, the capacitive signal corresponding to capacitive sensor 208 will increase from zero to its maximum value, at time $t_4$, after capacitive signal 706 because it is the fourth capacitive sensor to come into contact with the water.

Figure 8A:
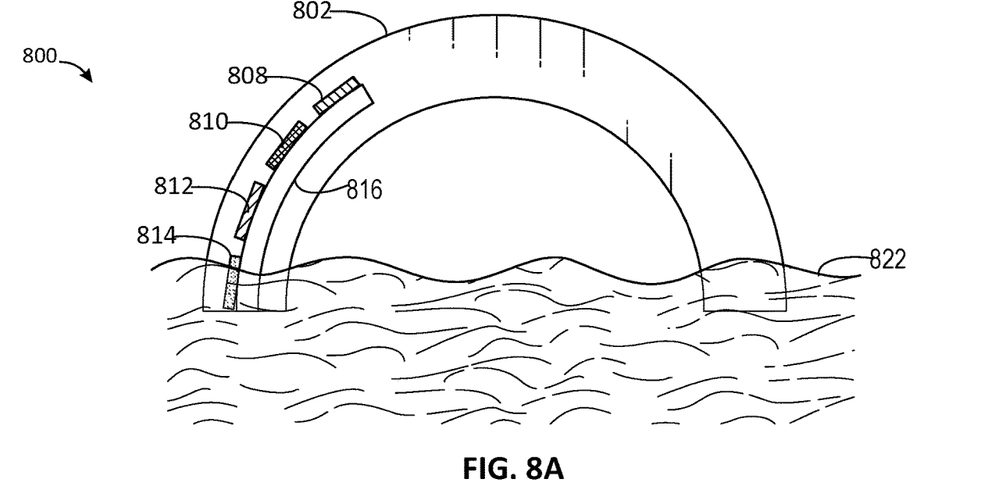
FIGS. 8A, 8B, and 8C depict an illustrative capacitive water depth sensor system integrated into a wheel well molding in accordance with the present disclosure.
Figure 8B:
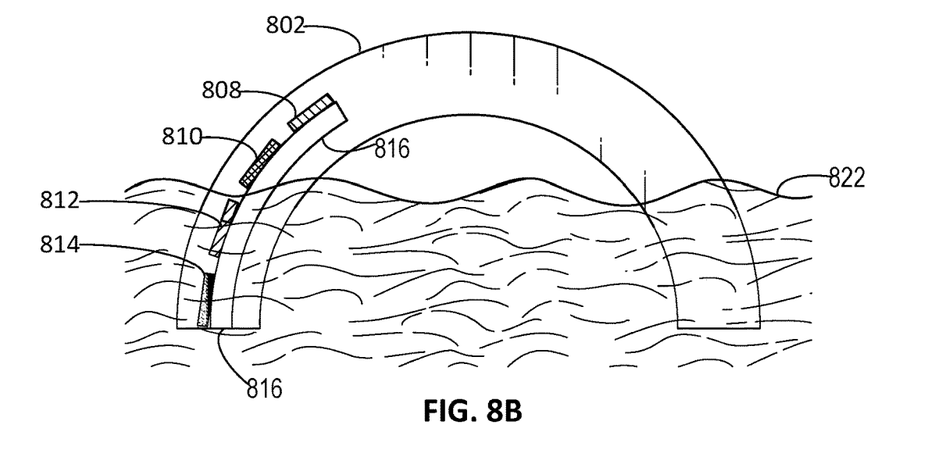
Figure 8C:
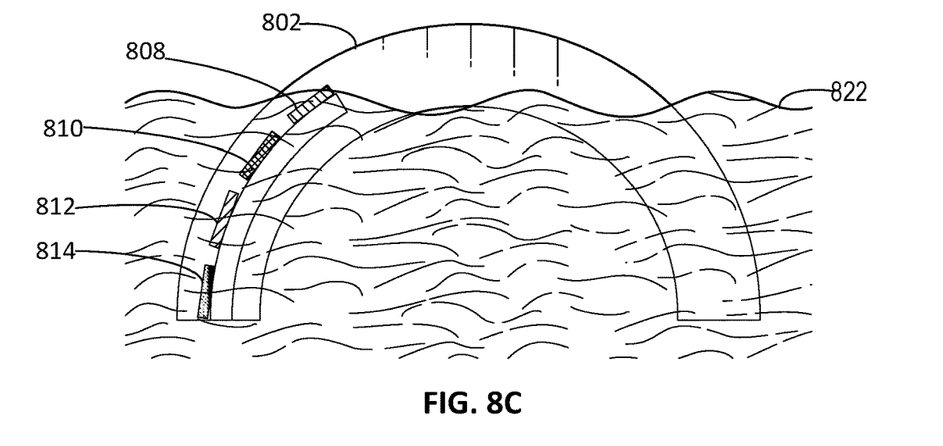

FIGS. 8A, 8B, and 8C depict an illustrative capacitive water depth sensor system integrated into a wheel well molding in accordance with the present disclosure. FIG. 8A depicts fender portion 802 on which cavity 816 is molded into, and capacitive sensors 814, 812, 810, and 808 are inlaid. Water 822 corresponds to water that rises to the level of capacitive sensor 814 at fender portion 802. Capacitive sensor 814 may correspond to capacitive sensor 214, and the capacitive signal generated by capacitive sensor 814 may correspond to capacitive signal 702. FIG. 8B depicts fender portion 802 on which cavity 816 is molded into, and capacitive sensors 814, 812, 810, and 808 are inlaid. Water 822 corresponds to water that rises to the level of capacitive sensor 812 at fender portion 802. Capacitive sensor 812 may correspond to capacitive sensor 212, and the capacitive signal generated by capacitive sensor 812 may correspond to capacitive signal 704. FIG. 8C depicts fender portion 802 on which cavity 816 is molded into, and capacitive sensors 814, 812, 810, and 808 are inlaid. Water 822 corresponds to water that rises above capacitive sensor 810 and above capacitive sensor 808 at fender portion 802. Capacitive sensor 810 may correspond to capacitive sensor 210, and the capacitive signal generated by capacitive sensor 810 may correspond to capacitive signal 706. Capacitive sensor 808 may correspond to capacitive sensor 208, and the capacitive signal generated by capacitive sensor 808 may correspond to capacitive signal 708.

Figure 9B:
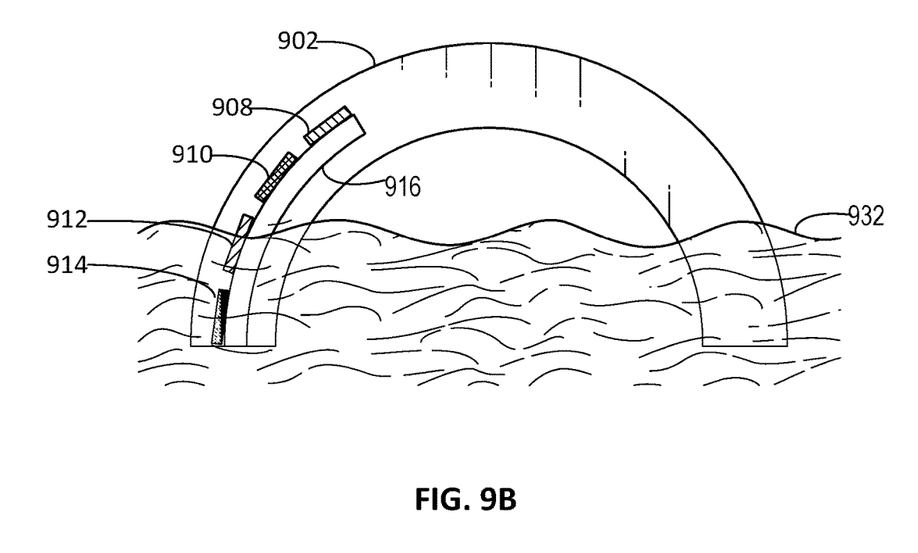
FIG. 9B depicts an illustrative capacitive water depth sensor system integrated into a wheel well molding in accordance with the present disclosure.

FIG. 9A is a graphical representation of a capacitive water depth sensor system detecting water in a wheel well molding in accordance with the present disclosure. Graph 900 depicts signals corresponding to capacitive sensors 908, 910, 912, and 914, in FIG. 9B, which correspond to capacitive sensors 208, 210, 212, and 214 respectively for a vehicle driving through water. Graph 900 includes a time axis (Time 922) and a capacitive signal axis measuring the amplitude of the capacitive signal (Capacitive Signal 920) of capacitive sensors 908, 910, 912, and 914. For example, capacitive sensor 914 may generate a capacitive signal corresponding to capacitive signal 926. Capacitive sensor 912 may generate a capacitive signal corresponding to capacitive signal 924. Capacitive sensor 910 may generate a capacitive signal corresponding to capacitive signal 928. Capacitive sensor 908 may generate a capacitive signal corresponding to capacitive signal 930. At time $t_1$ the vehicle may have traveled over an object raising the vehicle and consequently raising capacitive sensor 912 above water 932 at a linear rate until time $t_2$, thereby resulting in capacitive signal 924 dropping linearly over the same period of time. At $t_2$ the vehicle may begin to descend into water 932 thereby causing capacitive sensor 912 to be submerged in water 932 and causing capacitive signal 924 to increase linearly from time $t_2$ onward. This may indicate that the vehicle drove down out of a small valley filled with water and back into another small valley with water. It should be noted that the slope of capacitive signal 924 between time $t_1$ and time $t_2$ is linear indicating that the vehicle was moving at a relatively slow pace in driving through the water as the vehicle ascended out of the valley. Similarly, as the vehicle drove into the next small valley the operator of the vehicle was driving at a reasonable pace as indicated by the slope of capacitive signal 924 from $t_2$ onward. When the vehicle accelerates, decelerates, and/or turns, water will slosh inside gap 218, or on the exterior of the wheel well producing pronounced changes in capacitive signal levels and the variability in the capacitive signal. As such, large capacitive signal values associated with a variability in the capacitive signal may be an indicator of driving on a flooded surface. Furthermore, a signal from the vehicle accelerometer may be used to match the pattern generated by the capacitive sensors.

Figure 10:
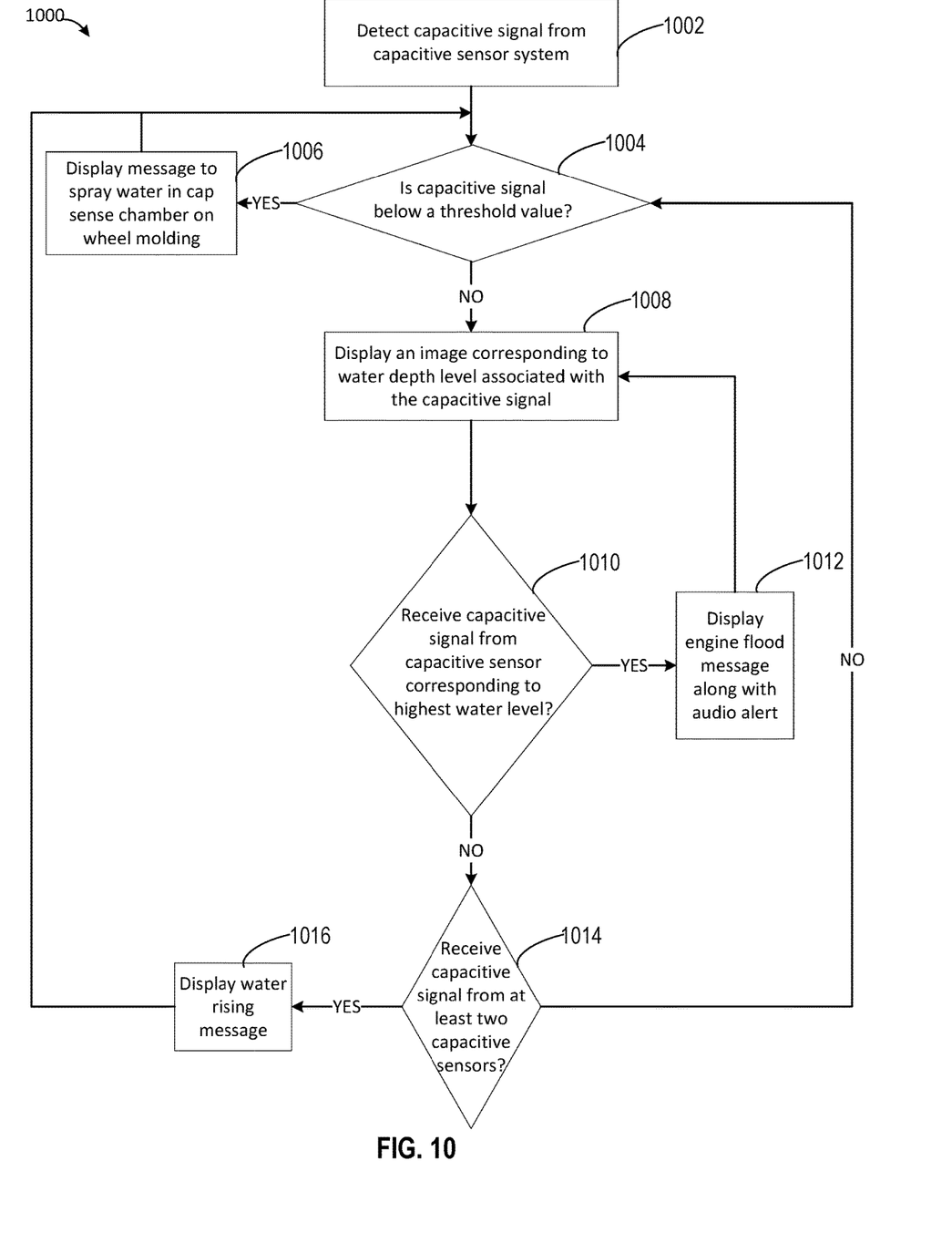
FIG. 10 is a flowchart of an example method of the present disclosure related to detecting water in a wheel well molding in accordance with the present disclosure.

FIG. 10 is a flowchart of an example method of the present disclosure related to detecting water in a wheel well molding in accordance with the present disclosure. At block 1002 the method may detect a capacitive signal from a capacitive sensor system in a vehicle. The capacitive sensor system may include a plurality of capacitive sensors coupled to one or more processors. The capacitive sensor system may detect a capacitive signal after one or more of the capacitive sensors generates a capacitive signal corresponding to an object with a dielectric constant associated with water (i.e., capacitive sensor detects water). The method may progress to block 1004 and determine if the capacitive signal is below a threshold value. If the capacitive signal is below the threshold value (YES) the method may progress to block 1006, and the method may then display a message on a display in the cab of the vehicle prompting an operator of the vehicle to activate an actuator to spray a cleansing solution into a cap sense chamber in the wheel molding. If the capacitive signal is below a certain threshold value, that indicates that a dielectric of one or more objects in the vicinity of the capacitive sensors is much higher than water thereby indicating that the one or more objects may be environmental substance such as snow. The environmental substance may also be mud or dirt. The one or more objects may be covering the one or more sensors. The cap sense chamber may correspond to gap 218 in FIG. 2. After displaying the message, the method may progress back to block 1004. In some embodiments, the method may receive a signal from the display, corresponding to instructions to actuate an actuator that dispenses the cleansing solution. The display may send instructions to one or more processors associated with the capacitive sensor system, which may in turn send a signal to the actuator causing the actuator to dispense the cleansing solution.

If the capacitive signal is not below the threshold value (NO), the method may progress to block 1008 and the method may display an image on the display corresponding to a water depth level associated with the capacitive signal. The water depth level may be detected as explained above with reference to FIGS. 8A-8C and FIGS. 9A-9B. The display may be a graphical image indicating the level of water relative to the vehicle. In other embodiments there may be cameras displaying the water that is around the vehicle. The method may then progress to block 1010 and determine whether a capacitive signal is received from a capacitive sensor corresponding to the highest water level. If the method determines that signal is received (YES), the method may progress to block 1012, and may display an engine flood message on a display in the cab of the vehicle, and may cause one or more speakers to emit an audio alert warning the operator that the engine will flood causing thereby causing the engine to stall. For example, this may correspond to FIG. 8C wherein water 822 exceeds capacitive sensors 808, 810, 812, and 814, and capacitive sensors 808, 810, 812, and 814 each generate a capacitive signal that corresponds to a maximum value because they are submerged by water 822. The method may progress to block 1008 after displaying the engine flood message and causing the speakers to emit an audio alert. In a scenario in which water levels rise underneath a vehicle while it is parked, the method may send a short message service (SMS) to a mobile device associated with the operator of the vehicle. In some embodiments, the method may send a message to the mobile device via an application service hosted by a server (i.e., a mobile application executing on the mobile device). If the method determines that a capacitive signal is not received corresponding to the highest water level (NO) the method may progress to block 1014 and determine whether a capacitive signal is received from at least two capacitive sensors. For example, the method may determine if water 822 has exceeded capacitive sensors 814 and 812 as in FIG. 8B. If the method determines that the water has exceeded at least two capacitive sensors (YES), the method may display a water rising message, at block 1016, on a display in the cab of the vehicle, and may cause one or more speakers to emit an audio alert warning the operator that the water level is rising. The method may then progress back to block 1004. If the method determines that it does not receive a capacitive signal from at least two capacitive sensors (NO), then the method may progress to block 1004.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments. Although certain aspects of various embodiments may have been described using a singular word or phrase (such as "a signal" or "a processor") it should be understood that the description may be equally applicable to plural words or phrases (such as "signals" and "processors").

That which is claimed is:

1. A method comprising:
receiving, by one or more processors, a first capacitive signal from a first capacitive sensor in a wheel well of a vehicle;
determining that the first capacitive signal is not below a threshold value;
displaying an image in a cab of the vehicle, wherein the image corresponds to a water depth level associated with the first capacitive signal;
receiving a second capacitive signal from a second capacitive sensor corresponding to a rising water level; and
displaying a warning message, on a display, indicating the rising water level.

2. The method of claim 1, further comprising:
determining that a highest level capacitive signal is received from the highest mounted capacitive sensor, corresponding to a highest water level; and
displaying a warning message, on the display, indicating that an engine in the vehicle will flood.

3. The method of claim 1, further comprising:
sending a short message service (SMS) to a mobile device of an operator of the vehicle responsive to the second capacitive signal from the second capacitive sensor.

4. The method of claim 1, further comprising:
sending a message to an application on a mobile device of an operator of the vehicle responsive to receiving the second capacitive signal from the second capacitive sensor.

5. The method of claim 1, further comprising:
   determining that the first capacitive signal is below a threshold value; and
   determining that the first capacitive signal corresponds to environmental substance; and
   displaying a message on the display indicating that the first capacitive sensor is covered in environmental substance.

6. The method of claim 5, wherein when the first capacitive signal is below the threshold value and there is a change in a dielectric of the first capacitive sensor, from a dielectric associated with air to a dielectric associated with environmental substance.

7. The method of claim 1, further comprising:
   receiving a signal from the display comprising instructions to actuate an actuator to dispense a cleansing solution onto the first capacitive sensor.

8. The method of claim 1, wherein when the first capacitive signal is not below a threshold value and there is a change in a dielectric of the first capacitive sensor.

9. The method of claim 8, wherein the change in the dielectric corresponds to a change from a dielectric corresponding to air to a dielectric corresponding to water.

10. A system comprising:
    a first capacitive sensor in a wheel well of a vehicle; and
    memory and processing circuitry configured to:
      receive a first capacitive signal from the first capacitive sensor;
      determine that the first capacitive signal is not below a threshold value;
      display an image in a cab of the vehicle, wherein the image corresponds to a water depth level associated with the first capacitive signal;
      receive a second capacitive signal from a second capacitive sensor corresponding to a rising water level; and
      display a warning message, on a display, indicating the rising water level.

11. The system of claim 10, wherein the memory and processing circuitry is further configured to:
    determine that a highest level capacitive signal is received from the highest mounted capacitive sensor; and
    display a warning message, on the display, indicating that an engine in the vehicle will flood.

12. The system of claim 10, wherein the memory and processing circuitry is further configured to:
    send a short message service (SMS) to a mobile device of an operator of the vehicle responsive to receiving the second capacitive signal from the second capacitive sensor.

13. The system of claim 10, wherein the memory and processing circuitry is further configured to:
    send a message to an application on a mobile device of an operator of the vehicle responsive to receiving the second capacitive signal from the second capacitive sensor.

14. The system of claim 10, wherein the memory and processing circuitry is further configured to:
    determine that the first capacitive signal is below a threshold value; and
    determine that the first capacitive signal corresponds to environmental substance; and
    display a message on the display indicating that the first capacitive sensor is covered by an environmental substance.

15. The system of claim 14, wherein when the first capacitive signal is below the threshold value and there is a change in a dielectric of the first capacitive sensor, from a dielectric associated with air to a dielectric associated with environmental substance.

16. The system of claim 10, wherein the memory and processing circuitry is further configured to:
    receive a signal from the display comprising instructions to actuate an actuator to dispense a cleansing solution onto the first capacitive sensor.

17. The system of claim 10, wherein when the first capacitive signal is not below a threshold value and there is a change in a dielectric of the first capacitive sensor.

18. The system of claim 17, wherein the change in the dielectric corresponds to a change from a dielectric corresponding to air to a dielectric corresponding to water.

19. The system of claim 10, wherein first capacitive sensor is embedded in a cavity within the wheel well.

20. The system of claim 10, wherein the first capacitive sensor comprises a conductive primer applied to plastic of the wheel well.

* * * * *